US009103136B2

(12) United States Patent
Poore (10) Patent No.: US 9,103,136 B2
(45) Date of Patent: Aug. 11, 2015

(54) MODULAR SAFETY AND SUPPORT STRUCTURE FOR USE IN LARGE GRAIN BINS AND A METHOD FOR ITS USE

(76) Inventor: Donald L. Poore, Shelbina, MO (US)

( * ) Notice: Subject to any disclaimer, the term of this patent is extended or adjusted under 35 U.S.C. 154(b) by 420 days.

(21) Appl. No.: 13/072,331

(22) Filed: Mar. 25, 2011

(65) Prior Publication Data

US 2012/0241253 A1    Sep. 27, 2012

(51) Int. Cl.
  *A01F 25/16*   (2006.01)
  *E04H 7/22*    (2006.01)
  *A62B 33/00*   (2006.01)

(52) U.S. Cl.
  CPC ............... *E04H 7/22* (2013.01); *A01F 25/163* (2013.01); *A62B 33/00* (2013.01); *Y10T 29/49826* (2015.01)

(58) Field of Classification Search
  CPC .......... A01F 25/163; A62B 33/00; E04H 7/22
  USPC ............. 182/82, 128, 142, 145, 150; 52/192–197, 651.1, 649.3; 220/694, 220/890, 638, 636, 634, 630, 628, 495, 494, 220/485
  See application file for complete search history.

(56) References Cited

U.S. PATENT DOCUMENTS

| 3,638,331 | A | | 2/1972 | Steffen |
| 3,856,109 | A | | 12/1974 | Gates |
| 3,907,065 | A | | 9/1975 | Steffen |
| 4,276,956 | A | * | 7/1981 | Mamula et al. ............... 182/128 |
| 5,009,052 | A | | 4/1991 | Welch |
| 6,247,277 | B1 | | 6/2001 | Kerpash, Sr. |
| 6,983,824 | B1 | * | 1/2006 | Dandurand ..................... 182/82 |
| 2010/0224447 | A1 | * | 9/2010 | Rogers .......................... 182/222 |

* cited by examiner

*Primary Examiner* — Charles A Fox
*Assistant Examiner* — Kristine Florio
(74) *Attorney, Agent, or Firm* — Muskin & Farmer LLC (57) ABSTRACT

A safety support structure for use in grain storage bins comprising vertical and horizontal parts, which can be connected to provide a scaffold sufficient to support one or more persons. This safety support structure can be used to prevent a person from becoming trapped in the grain contained within the bin as well as to provide a stable place for a person to work within the bin. The present safety support structure can be freestanding so as not to interfere with any operations above the structure, and also have the ability to be raised off the grain bin floor in order to facilitate removal of grain from the floor with a sweep auger.

16 Claims, 6 Drawing Sheets

MODULAR SAFETY AND SUPPORT STRUCTURE FOR USE IN LARGE GRAIN BINS AND A METHOD FOR ITS USE

FIELD OF THE INVENTION

The present device is a modular structure for use in large grain storage bins. Specifically, the present device is a type of modular scaffolding that is to be located in the center of the storage bin above a grain sump. This modular scaffolding is intended to both provide a worker within a grain bin a secure place to stand while working on the bin as well as to provide a person trapped within the grain a means to escape.

BACKGROUND

Grain bins are commonly used to store vast amounts of grain or other granular materials. These materials are typically removed from the bin through the use of a sump located below an opening at the center of the bottom of the bin. As the material flows out of the bin, a cone-shaped area of downward flow is formed in the center of the remaining material, which creates a quicksand-like effect. Although this hazard is known, many people become trapped by this cone-shaped area of downward flow every year. Some die of suffocation when they are unable to free themselves from the grain or to be rescued by others. These people are often drawn into this trap to break up clumps of grain or to attempt a repair to the bin while it still contains grain.

Sometimes an entire layer of grain can be become hardened after it comes into contact with moisture. This can allow air pockets to form under this layer of material thus forming a bridge over the empty space. When a person steps on top of this bridge, his weight may cause it to collapse into the air pocket. The surrounding materials can then flow into the pocket covering the person and preventing him from escaping and possibly causing injury or death.

Some safety devices have been invented for the purpose of assisting a person who becomes trapped in a grain bin, however, these devices are not widely used for several reasons. These devices can be difficult to install, particularly if they were to be retrofitted into an existing grain bin. Furthermore, present designs can interfere with equipment used to stir and spread the grain from above and/or sweep augers commonly used to clean the bottoms of such bins.

Additionally, none of these exiting solutions address the reasons why people venture into grain bins. Workers often need to repair part of the bin or break up clumped grain within the bin, but have no place to safely stand within the center of the bin.

What is needed is a support structure for use in grain storage bins that is capable of both helping a trapped person to escape from the stored material and to give a worker a place to safely perform work within the grain bin. Additionally, this support structure should not interfere with equipment used to stir and spread the grain from above or sweep augers commonly used to clean the bottoms of such bins.

SUMMARY OF THE INVENTION

It is an aspect of the present device to provide a safety support structure for use in grain storage bins that is capable of both helping a trapped person to escape from the stored material and gives a worker a place to safely work within the grain bin. It is a further aspect of the present device to provide a safety support structure which will not interfere with equipment used to stir and spread the grain from above or sweep augers commonly used to clean the bottoms of such bins.

The above aspects can be obtained by a safety support structure for use in a grain storage bin comprising two or more vertical support legs, at least one horizontal, circular support bar capable of being removably connected to the vertical support legs, at least one mounting base configured to be securely connected to the floor of a storage bin and removably connected to one or more vertical support legs, two or more fastening devices, each capable of removably connecting a vertical leg support to at least one mounting base, and at least one removable grate configured to be removably connected to at least one horizontal circular support bar.

The above aspects can also be obtained by a modular safety support structure for use in a grain storage bin comprising two or more vertical support legs, further comprised of small sections, configure to be combined to create at least one vertical support leg, at least one horizontal, circular support bar, further comprised of small sections, configured to be combined to create at least one horizontal, circular support bar that is removably connected to the vertical support legs, two or more mounting bases, each configured to be removably connecting a vertical leg support to a storage bin floor, and at least one grate section, further comprised of small sections, configure to be combined to create a grate that is removably connected to the horizontal, circular support bar.

The above aspects can also be obtained by a method for installing and using a modular safety support structure comprising: Providing a grain bin comprising a floor and a grain sump, and a modular safety support structure for use in a grain storage bin comprising two or more vertical support legs, further comprised of small sections, configure to be combined to create at least one vertical support leg, at least one horizontal, circular support bar, further comprised of small sections, configured to be combined to create at least one horizontal, circular support bar that is removably connected to the vertical support legs, two or more mounting bases, each configured to be removably connecting a vertical leg support to a storage bin floor, at least one grate section, further comprised of small sections, configure to be combined to create a grate that is removably connected to the horizontal, circular support bar, installing the modular safety support structure in the grain bin by placing all of the parts inside of the grain bin individually, connecting two or more mounting bases to the floor of the grain bin so that the safety support structure is located above a grain sump, connecting two or more vertical support legs to the mounting bases, connecting at least one horizontal, circular support bars to two or more vertical support legs, and connecting a grate section on one or more horizontal, circular support bars, and utilizing the safety support structure to avoid becoming entrapped in grain contained within the grain bin or to work within the grain bin.

BRIEF DESCRIPTION OF THE DRAWINGS

Further features and advantages of the present device, as well as the structure and operation of various embodiments of the present device, will become apparent and more readily appreciated from the following description of the preferred embodiments, taken in conjunction with the accompanying drawings of which.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Reference will now be made in detail to the presently preferred embodiments of the invention, examples of which are illustrated in the accompanying drawings, wherein like reference numerals refer to like elements throughout.

The present safety support structure is designed to stand alone in the center of a grain storage bin directly over the sump drain where grain is removed from the bin. This structure can be removably connected to the floor of the bin and require no structural support from connections attached to the top of the grain storage bin. In a preferred embodiment, it can be of modular construction allowing it to easily be installed in existing grain storage bins.

This safety support structure can allow an operator to safely position himself over the sump opening allowing him to monitor the flow of grain toward the sump or to break up obstructions inhibiting this flow. This feature can be provided by one or more horizontal circular support bars, providing a worker a place on which to stand, or a grid support place upon one or more of the horizontal support bars. Furthermore, the present safety support structure can provide adequate support to allow a person trapped in the grain pull himself free of the grain.

In a preferred embodiment the safety support scaffold can easily be removed from the floor of the grain bin using a fastening mechanism. The safety support structure can then be raised above the floor with a winch or similar lifting device so that the grain bin can be cleaned by a sweep auger.

Figure 1:
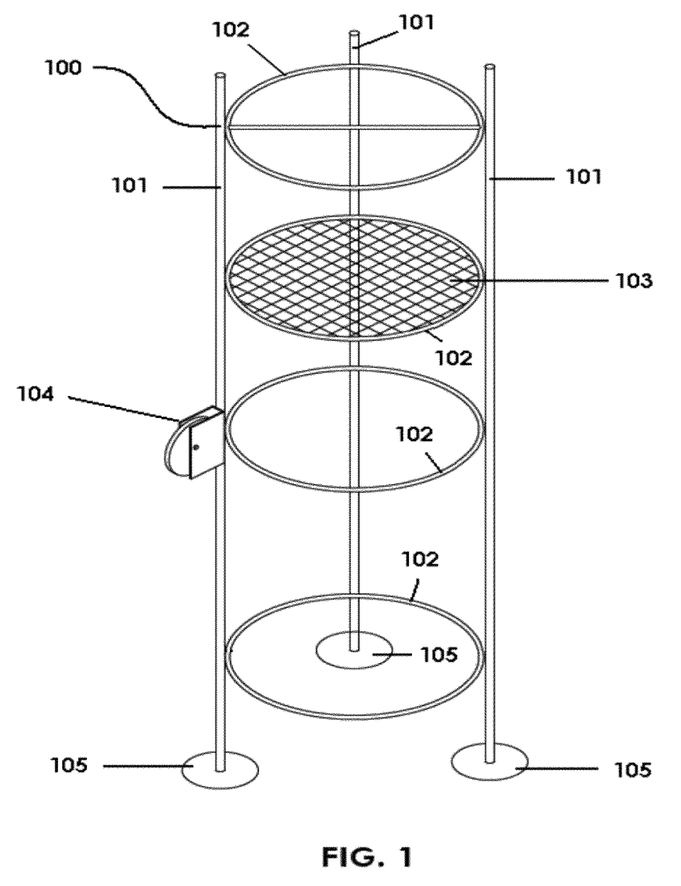
FIG. 1 is a front perspective view of a safety support structure, according to an embodiment.

FIG. 1 is a front perspective view of a safety support structure 100, according to an embodiment.

The safety support structure 100 can comprise vertical support legs 101, which can each be removably attached to the floor of a grain storage bin (not pictured) by one or more mounting bases 105. In a preferred embodiment, the safety support structure 100 can comprise three vertical support legs 101, but any number sufficient to support the structure 100 and any weight that may reasonably be placed upon it can be used. These vertical support legs 101 can also comprise notches or similar cutouts configured to receive horizontal circular support bars 102.

Horizontal circular support bars 102 can be connected to each of the vertical support legs 101 so that each horizontal circular support bar 102 is securely connected to all of the support legs 101. In a preferred embodiment, the vertical support legs 101 can comprise notches (not pictured) capable of receiving one or more horizontal circular support bars 102, and these bars 102 can be removably connected to each of the legs 101 with bolts or similar fastening devices.

In a preferred embodiment, the horizontal circular support bars 102 can be circular in order to allow the user the maximum freedom of movement while standing within the safety support structure 100. This circular shape also facilitates hands-free use by providing a place for the user to lean no mater what direction he or she is working. However, the horizontal support bars 102 can also be triangular, square or any shape that allows a user to comfortably work within it.

The safety support structure 100 can also comprise a winch 104, which can be connected to one of the vertical support legs 101. This winch 104 can be used to lift the structure 100 off of the grain bin floor (not pictured) when the floor is being cleaned or when access below the support structure 100 is needed for any other reason.

A removable grate 103 can be placed upon one or more of the horizontal circular support bars 102 in order to provide a platform upon which a user can stand while working inside the grain bin. The removable grate 103 is depicted as a screen, but can be any structure capable of both supporting a person and allowing grain to flow through it.

Figure 2:
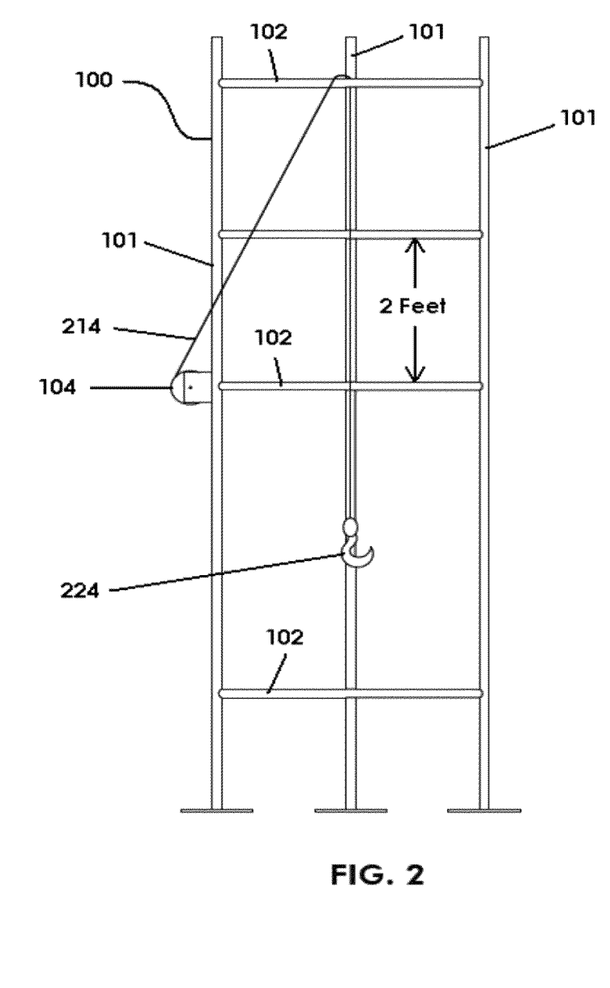
FIG. 2 is a front view of a safety support structure, according to an embodiment.

FIG. 2 is a front view of a safety support structure 100, according to an embodiment.

In a preferred embodiment, two or more of the horizontal circular support bars 102 can be connected along the length of the vertical support legs 101 with a space of approximately two feet between each support bar 102. This spacing can allow a person to easily climb the support structure 100 and provides a place for a worker to brace himself within the structure 100, which frees his hands and allows him to work within the grain storage bin (not pictured). Furthermore, this spacing can create a physical barrier to prevent a person from being sucked into the downward flow of grain.

In this view, a cable 214 and hook 224 are shown attached to the winch 104. The hook 224 can be attached to a suitable place within the grain bin and the winch 104 can be turned in order to lift the support structure 100.

Figure 3:
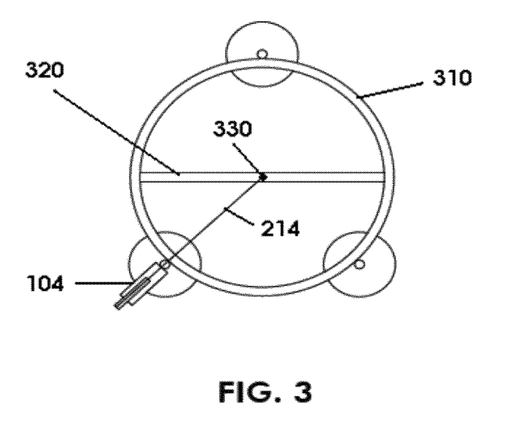
FIG. 3 is a top view of a safety support structure, according to an embodiment.

FIG. 3 is a top view of a safety support structure, according to an embodiment.

The uppermost horizontal circular support bar 310 can comprise a cross member 320 and a guide 330 The purpose of this cross member is to guide the cable 214 so as to allow the safety support structure to be lifted straight up.

Figure 3A:
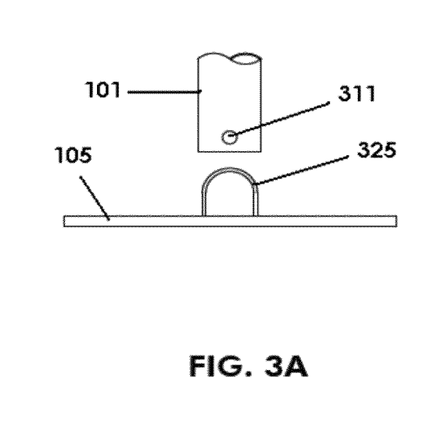
FIG. 3A is a close-up front view of the bottom of a vertical support leg and mounting base comprising a safety support structure, according to an embodiment.

FIG. 3A is a close-up front view of the bottom of a vertical support leg 101 and a mounting base 105 comprising a safety support structure, according to an embodiment.

The mounting base 105 can be securely fastened to the floor of a grain bin (not pictured) with bolts, screws or similar fastening devices. It 105 can also be welded to the grain bin floor. The mounting base 105 can also comprise a loop 325 or similar mounting structure configured to receive a bolt, pin or similar fastening device (not pictured in FIG. 3A). In a preferred embodiment, each loop 325 can be pivotably connected to each mounting base 105 so that it can lie flat and parallel to the grain bin floor so as not to interfere with a sweep auger or similar device. The bottom of each vertical support leg 101 can also comprise one or more holes 311 capable of receiving a bolt, pin or similar fastening device.

Figure 3B:
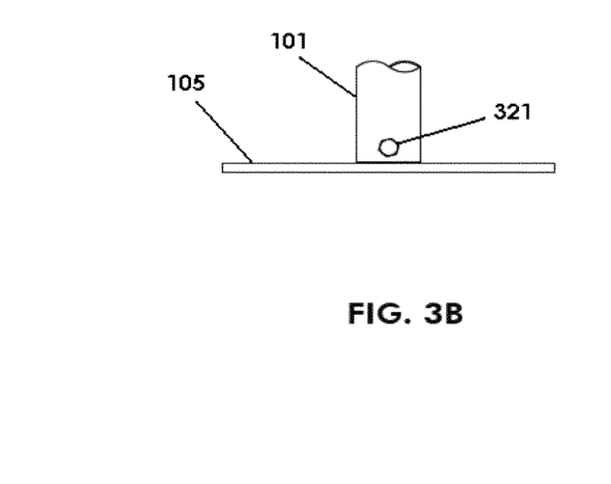
FIG. 3B is a close-up front view of the bottom of a vertical support leg removably connected to a mounting base comprising a safety support structure, according to an embodiment.

FIG. 3B is a close-up front view of the bottom of a vertical support leg 101 removably connected to a mounting base 105 comprising a safety support structure, according to an embodiment.

In this Figure, the vertical support leg 101 has been removably connected to the mounting base 105 by a bolt 321. This bolt 321 can be removed in order to allow the support structure to be lifted for cleaning the grain bin or similar purposes.

Figure 4:
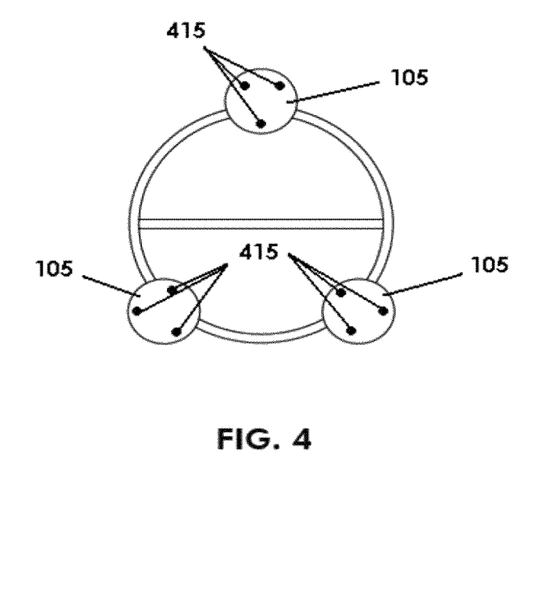
FIG. 4 is a bottom view of a safety support structure, according to an embodiment.

FIG. 4 is a bottom view of a safety support structure, according to an embodiment.

Holes 415 can be placed in each mounting base 105 in order to allow bolts or screws to be used to securely connect each mounting base 105 to the grain bin floor.

Figure 5:
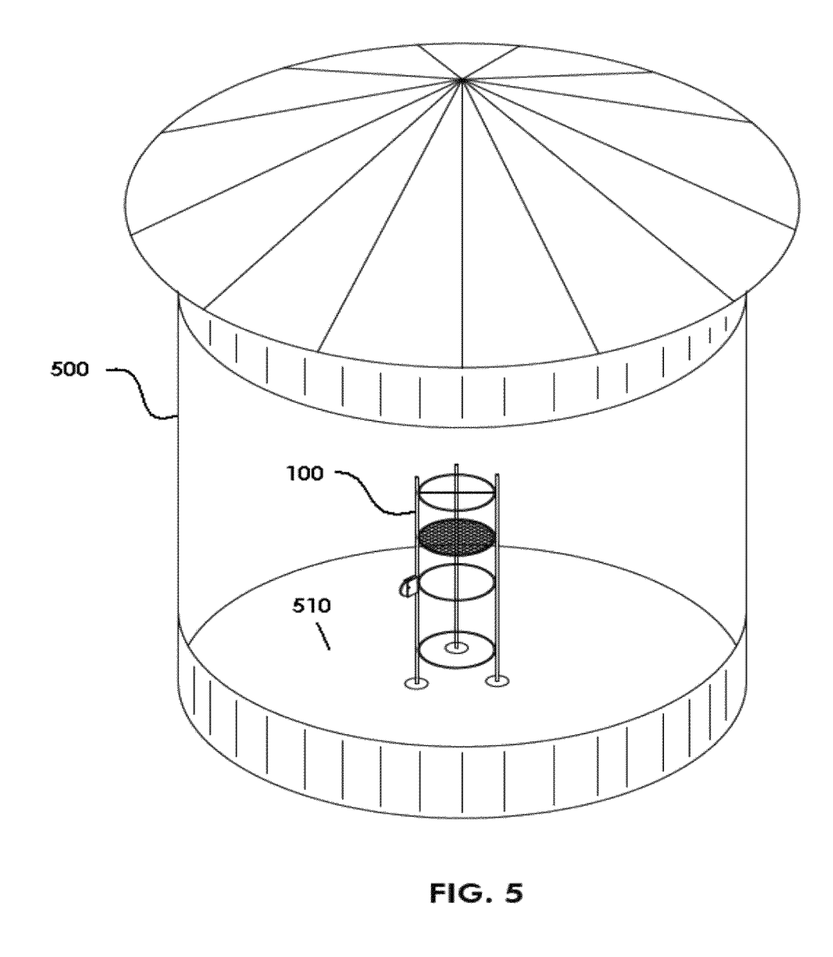
FIG. 5 is a side cutaway perspective view of a safety support structure installed in a grain storage bin, according to an embodiment.

FIG. 5 is a side cutaway perspective view of a safety support structure 100 installed in a grain storage bin 500, according to an embodiment.

The safety support structure 100 should be placed directly over the grain sump (not pictured) because this is the area where a person is most likely to become trapped by grain moving downward toward the sump. Such grain sumps are typically located in the center of the grain bin floor 510.

In a preferred embodiment, the safety support structure 100 can be comprised of metal. However, any material of suitable strength can be used including wood, plastic or any combination of suitable materials.

Figure 6:
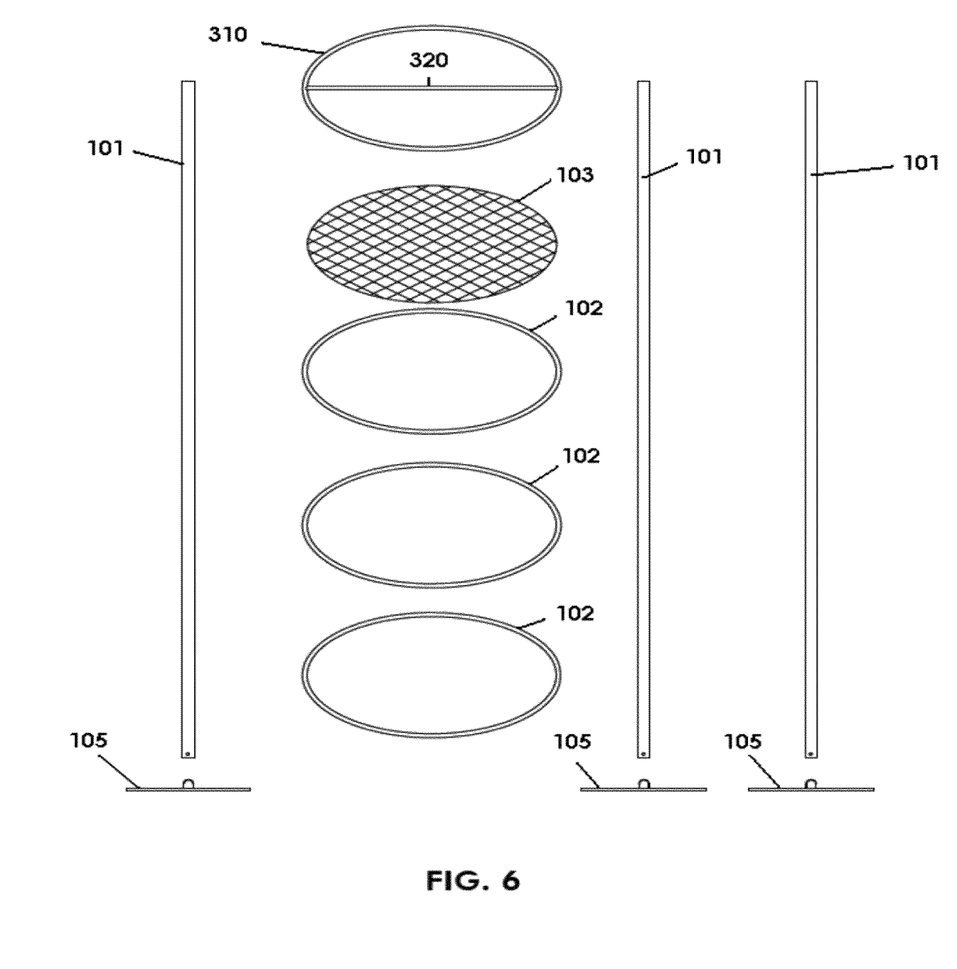
FIG. 6 is an exploded perspective view of a safety support structure, according to an embodiment.

FIG. 6 is an exploded perspective view of a safety support structure, according to an embodiment.

Although it may be possible to move a fully constructed support structure into a grain bin or to build a grain bin around a fully constructed support structure, in some instances the support structure will need to be constructed within an existing grain bin. Many such grain bins comprise only small manholes or doors through which to move people or materials in or out of the bin. Therefore, it is an aspect of the present device to be of modular construction wherein each of the pieces depicted in FIG. 6 can be moved into the bin individually where they can be used to construct the support structure. Additionally, the vertical support legs 101, horizontal circular support bars 102, and removable grate 103 can each be comprised of smaller parts configured to fit together in order to move the pieces comprising the support structure through small openings comprising many grain bins. In a preferred embodiment, the tops of the vertical support legs can be swaged in order to facilitate their connection to the bottoms of other vertical support legs, allowing the user to stack the vertical support legs to any desired height.

Figure 7:
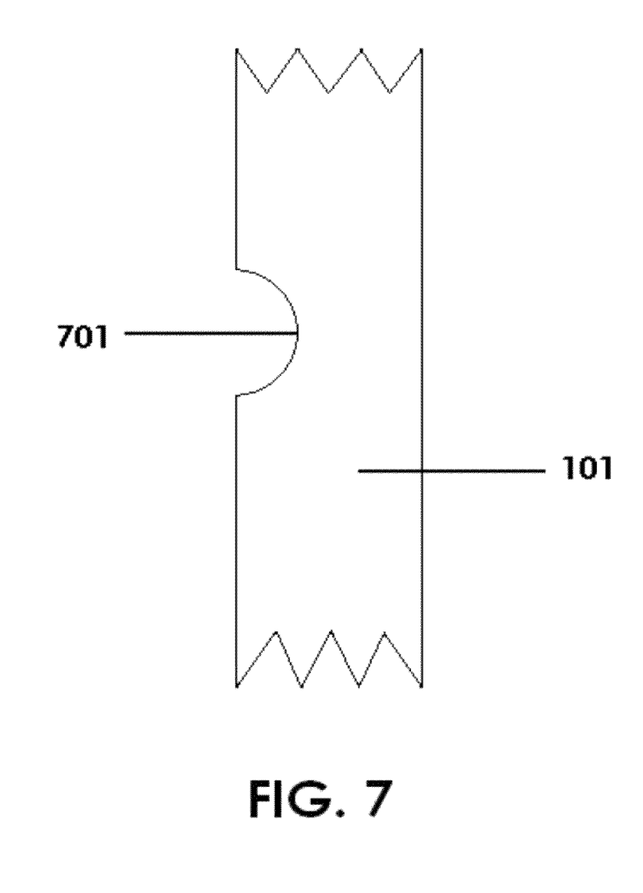
FIG. 7 is a close-up view if a vertical support leg comprising a notch for receiving a horizontal circular support bar, according to an embodiment.

FIG. 7 is a close-up view if a vertical support leg 101 comprising a notch 701 for receiving a horizontal circular support bar (not pictured), according to an embodiment.

The notch 701 depicted in FIG. 7, can perform at least two functions. First, it can add structural support to the joint formed by a vertical support leg 101 and a horizontal circular support bar (not pictured). Second, it can aid in the construction of the safety support structure by acting as a guide allowing the person building the support structure the ability to easily hold a horizontal circular support bar in the proper position in relation to a vertical support leg 102 while the two parts are connected.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A safety support structure for use in a grain storage bin comprising:
    a grain storage bin having a floor, a body, and a ceiling;
    three vertical support legs;
    at least one circular support ring removably connected to the vertical support legs, wherein the support ring has an inner circumference and an outer circumference such that the outer circumference tangentially connects to the vertical support legs;
    at least one mounting base connected to the floor of the grain storage bin and removably connected to one or more vertical support legs;
    two or more fastening devices, each removably connecting the vertical leg support to the mounting base; and
    at least one circular removable grate removably connected to the circular support ring within the inner circumference of the circular support ring.

2. The safety support structure as described in claim 1, wherein the fastening device is a pin removably connecting the vertical support leg to the mounting base.

3. The safety support structure as described in claim 1, wherein one or more mounting bases is bolted to the grain storage bin floor.

4. The safety support structure as described in claim 1, wherein one or more mounting bases is welded to the grain storage bin floor.

5. The safety support structure as described in claim 1, wherein the structure also comprises at least one winch further comprising a cable, a pulley, and a hook, such that the pulley is attached to the grain storage bin ceiling and the hook is attached to the safety support structure.

6. The safety support structure as described in claim 1, wherein the structure is comprised of metal.

7. The safety support structure as described in claim 1, wherein the structure is comprised of plastic.

8. The safety support structure as described in claim 1, wherein the structure is comprised of wood.

9. A modular safety support structure for use in a grain storage bin comprising:
    a grain storage bin having a floor, a body, and a ceiling;
    two or more vertical support legs, further comprised of small sections, combined to create at least one vertical support leg;
    at least one circular support ring, further comprised of small sections, removably connected to the vertical support legs, wherein the support ring has an inner circumference and an outer circumference such that the outer circumference tangentially connects to the vertical support legs;
    two or more mounting bases, each connected to the floor of the grain storage bin and removably connecting a vertical leg support to the grain storage bin floor; and
    at least one circular grate section, further comprised of small sections, combined to create a circular grate that is removably connected to the circular support ring within the inner circumference of the circular support ring.

10. The modular safety support structure as described in claim 9, wherein the fastening device is a pin removably connecting the vertical support leg to the mounting base.

11. The safety support structure as described in claim 9, wherein the structure also comprises at least one winch further comprising a cable, a pulley, and a hook, such that the pulley is attached to the grain storage bin ceiling and the hook is attached to the safety support structure.

12. The modular safety support structure as described in claim 9, wherein the one or more mounting bases is bolted to the storage bin floor.

13. The modular safety support structure as described in claim 9, wherein the one or more mounting bases is welded to the grain storage bin floor.

14. The modular safety support structure as described in claim 9, wherein the structure is comprised of metal.

15. The modular safety support structure as described in claim 9, wherein the structure is comprised of plastic.

16. The modular safety support structure as described in claim 9, wherein the structure is comprised of wood.

* * * * *